United States Patent
Gouze et al.

(10) Patent No.: US 7,415,904 B2
(45) Date of Patent: Aug. 26, 2008

(54) ELECTROMECHANICAL ACTUATORS

(75) Inventors: Philippe Gouze, Villemoisson (FR);
Yvon Joncour, Osny (FR)

(73) Assignee: Sagem SA, Paris (FR)

( * ) Notice: Subject to any disclaimer, the term of this patent is extended or adjusted under 35 U.S.C. 154(b) by 764 days.

(21) Appl. No.: 10/499,752

(22) PCT Filed: Dec. 20, 2002

(86) PCT No.: PCT/FR02/04490

§ 371 (c)(1),
(2), (4) Date: Dec. 28, 2004

(87) PCT Pub. No.: WO03/054423

PCT Pub. Date: Jul. 3, 2003

(65) Prior Publication Data

US 2005/0094331 A1 May 5, 2005

(30) Foreign Application Priority Data

Dec. 20, 2001 (FR) .................................. 01 16711

(51) Int. Cl.
*F16H 37/12* (2006.01)
(52) U.S. Cl. .............................. 74/42; 74/89.16; 74/527
(58) Field of Classification Search ..................... 74/42, 74/89.16, 97.1, 528, 529, 527; 49/109, 110; 244/102 R, 102 SL
See application file for complete search history.

(56) References Cited

U.S. PATENT DOCUMENTS 3,219,334 A * 11/1965 Lynn et al. ..................... 49/122
3,942,385 A    3/1976 Westerdale

FOREIGN PATENT DOCUMENTS

DE           41605 C     5/1887
DE         3009418 B     5/1981
GB         2184196       6/1987

* cited by examiner

*Primary Examiner*—William C Joyce
(74) *Attorney, Agent, or Firm*—Blakely, Sokoloff, Taylor & Zafman LLP

(57) ABSTRACT

The invention concerns an electromechanical actuator comprising at least an electric motor (1), as well as coupling (4) and gear reduction (4) means, which drive an output shaft (11). The invention is characterized in that the coupling and gear reduction means mesh with a crank plate (7) designed to be driven in rotation with an angular travel limited by two stops, a small connecting rod (9) being articulated to one end on a crank pin (8) of said crank plate and being articulated at its other end on a long connecting rod (10) which is itself integral with the output shaft, the two ends of said long connecting rod being respectively guided in displacement each along a guide, and the displacement angle between said two stops is more than 180°, the movements of the rod being structurally locked in case of overriding, the crank plate being immediately proximate to one of its travel limit stops.

10 Claims, 5 Drawing Sheets

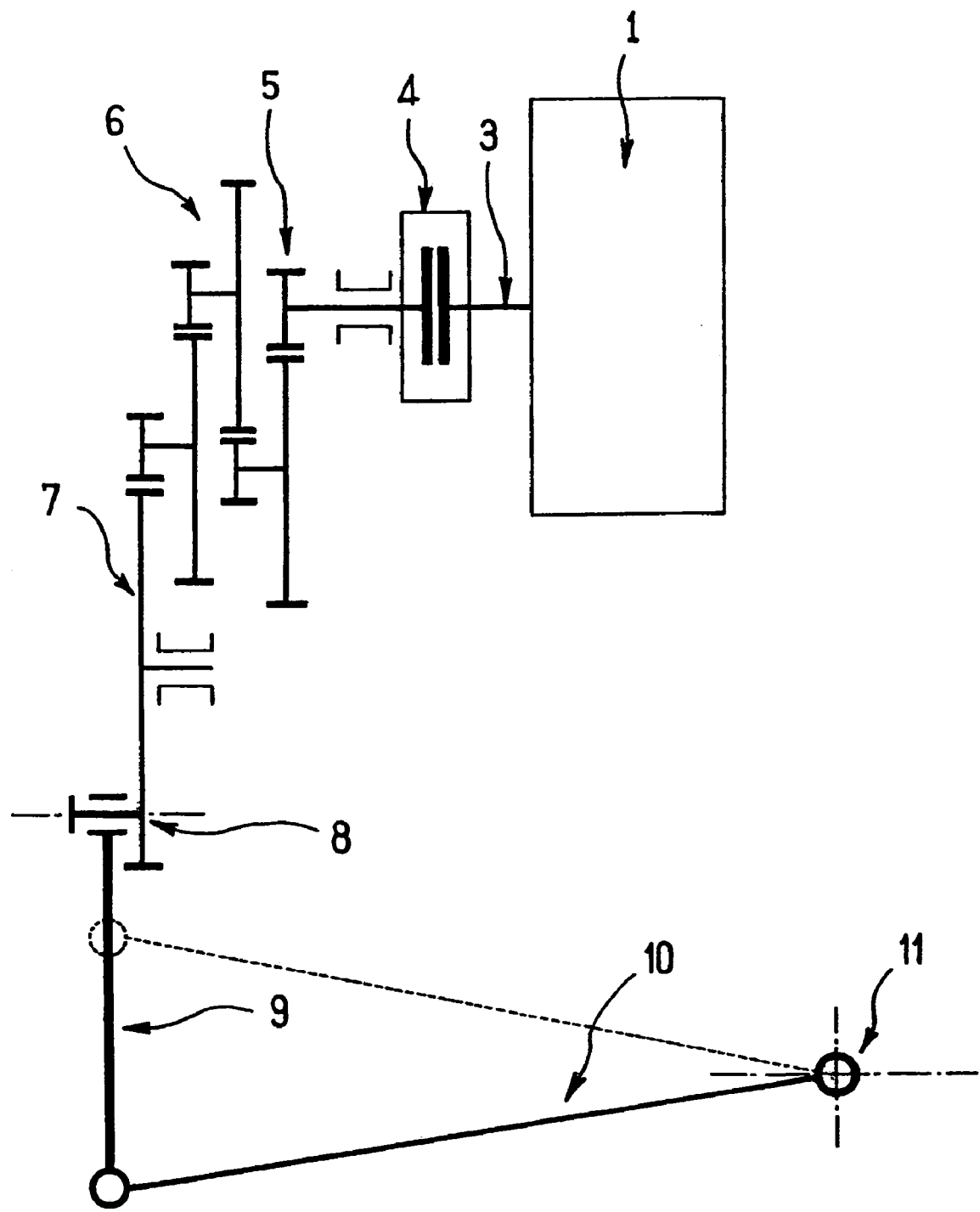
FIG_1

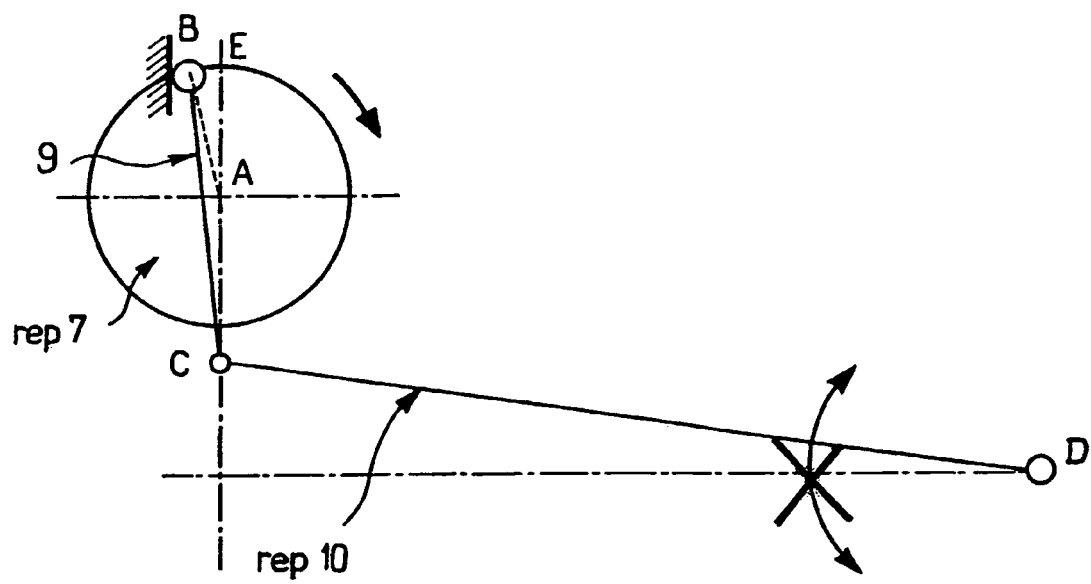
FIG_2
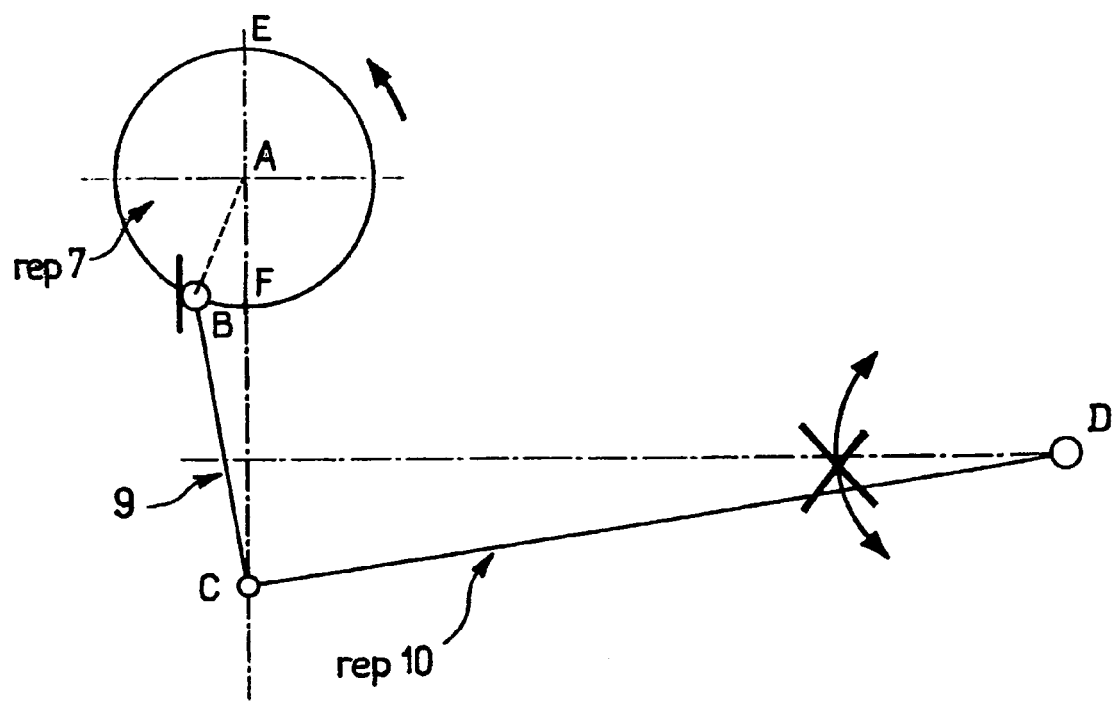
FIG_3

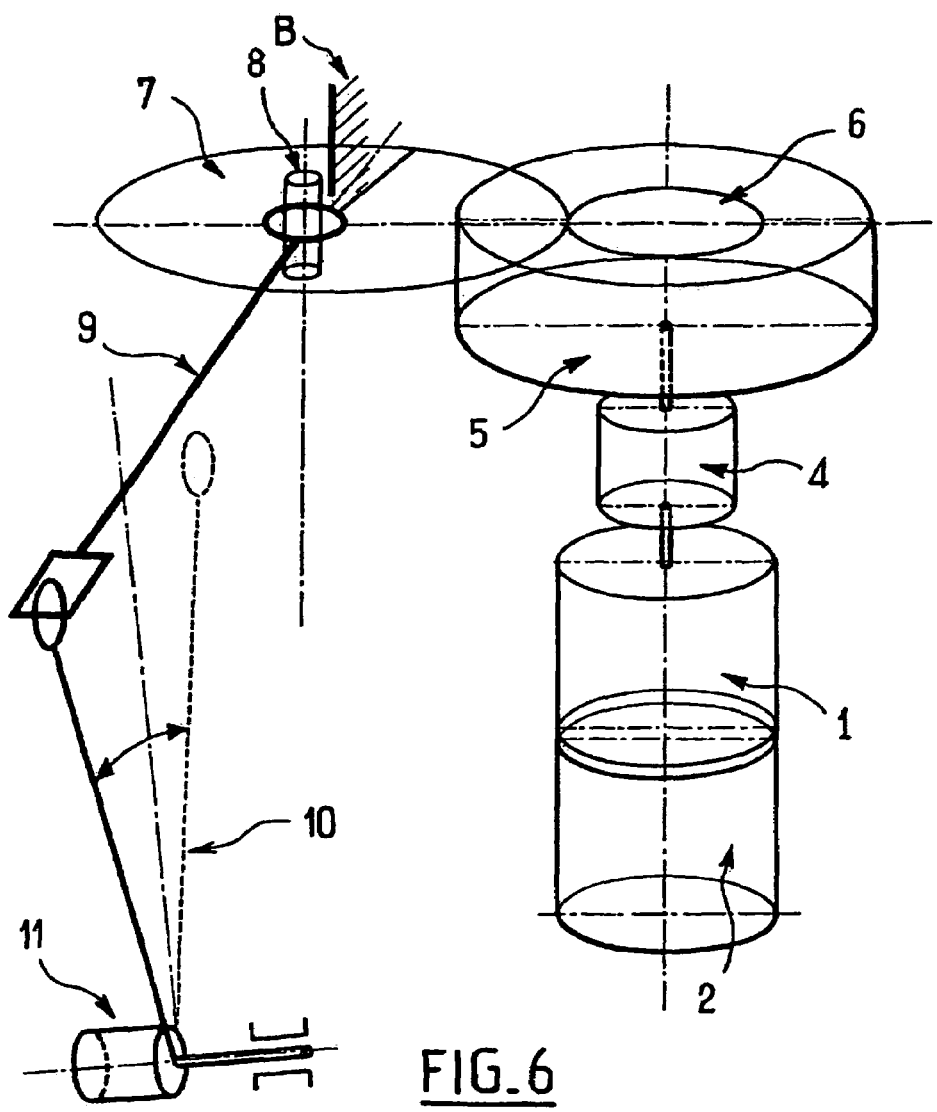
FIG_6
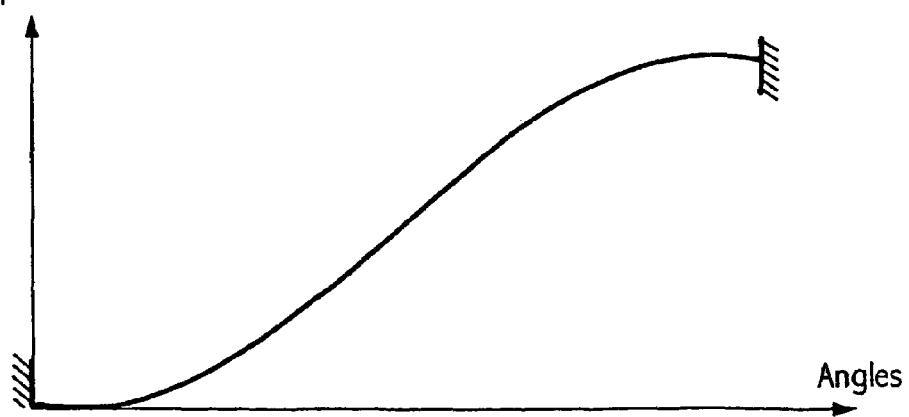
FIG_7

ELECTROMECHANICAL ACTUATORS

The present patent application is a non-provisional application of International Application No. PCT/FR02/04490, filed Dec. 20, 2002.

GENERAL FIELD AND PRIOR ART

This invention relates to electromechanical actuators.

It is advantageously used for the actuators equipping aircraft landing gear uplock boxes and their doors.

The overall purpose of the proposed device, in particular, is to ensure the mechanical unlocking operation in back-up mode, enabling extension of the landing gear by gravity.

DISCLOSURE OF THE INVENTION

The proposed solution is based, in particular, on the use of proven technologies but, in comparison with traditional solutions, the implementation of said solution enables a weight advantage, a simple design, and a reduced current consumption. Besides its direct impact, the reduced weight makes it possible to reduce the mechanical stresses related to the high accelerations during use. The simple design and the reduced number of parts make it possible to guarantee a high level of reliability. Finally, the reduced consumption due to the actuator's high efficiency, not only has an advantage with respect to the generator, but also prevents overheating and stresses detrimental to a good level of reliability.

More precisely, the invention proposes an electromechanical actuator comprising at least one electric motor, as well as coupling and gear reduction means, which drive an output shaft, characterized in that said coupling and gear reduction means mesh with a crank plate designed to be driven in rotation with an angular travel limited by two stops, a small connecting rod being articulated at one end to a crank pin of said crank plate and being articulated at its other end to a long connecting rod which is itself integral with the output shaft, the two ends of said long connecting rod each being guided respectively in their travel along a guide, and in that the displacement angle between said two stops is greater than 180°, the movements of the connecting rod being structurally locked when, following an override, the crank plate is situated directly adjacent to one of its travel limit stops.

DESCRIPTION OF THE DRAWINGS

Other characteristics and advantages of the invention will become further apparent from the following description, which is purely illustrative and non-limiting and which must be read with reference to the appended drawings in which:

FIGS. 1 and 2 are kinematic chains showing a first possible embodiment of the invention;

FIGS. 3 and 4 are kinematic chains showing another possible embodiment of the invention;

FIGS. 5 and 6 are perspective schematic representations of the travel of the connecting rod in the embodiment of FIGS. 3 and 4;

FIG. 7 is the angular displacement curve of the connecting rod with relation to the angular position of the crank plate.

DESCRIPTION OF ONE OR MORE EMBODIMENTS OF THE INVENTION

General Points

Figure 4:
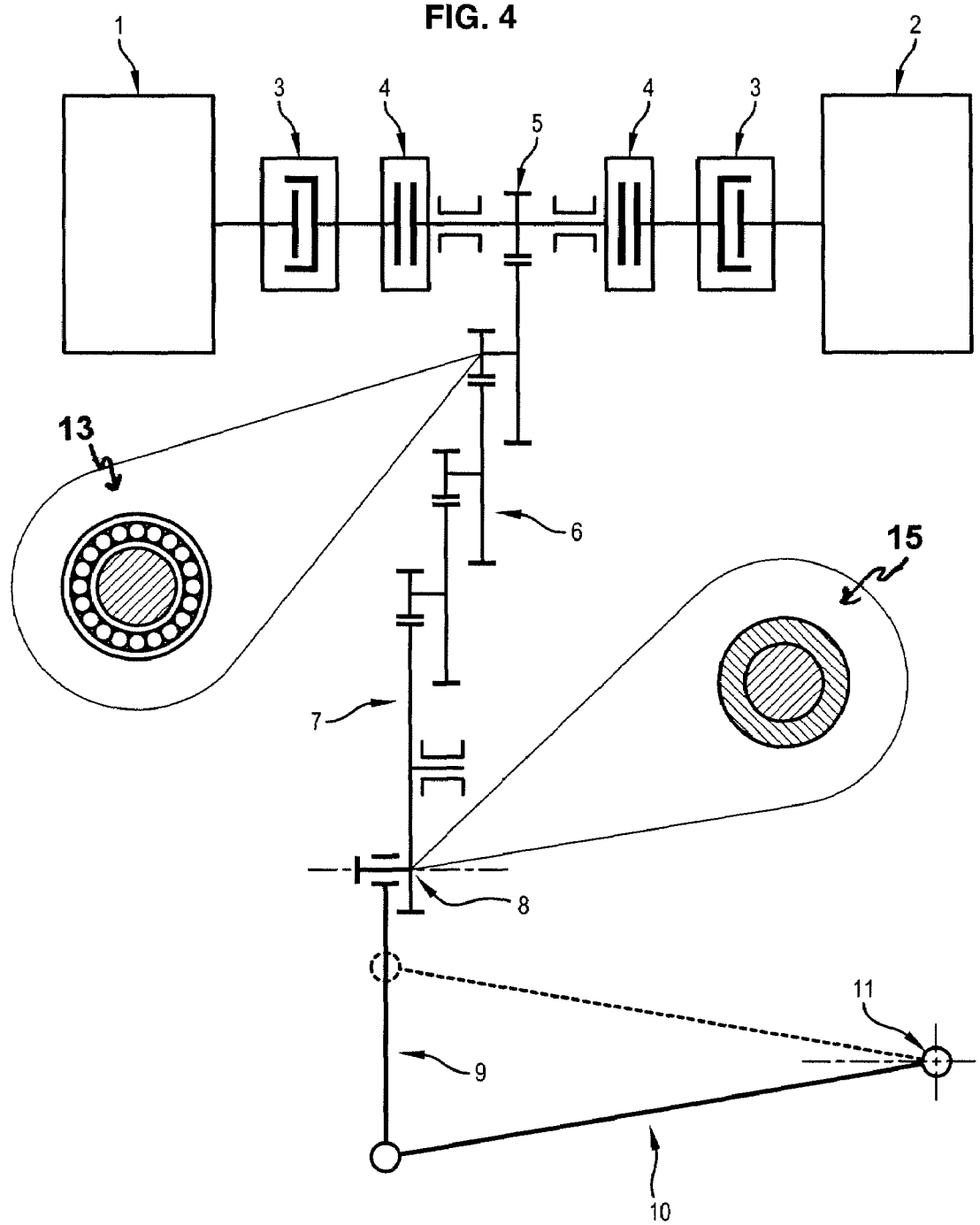
Figure 5:
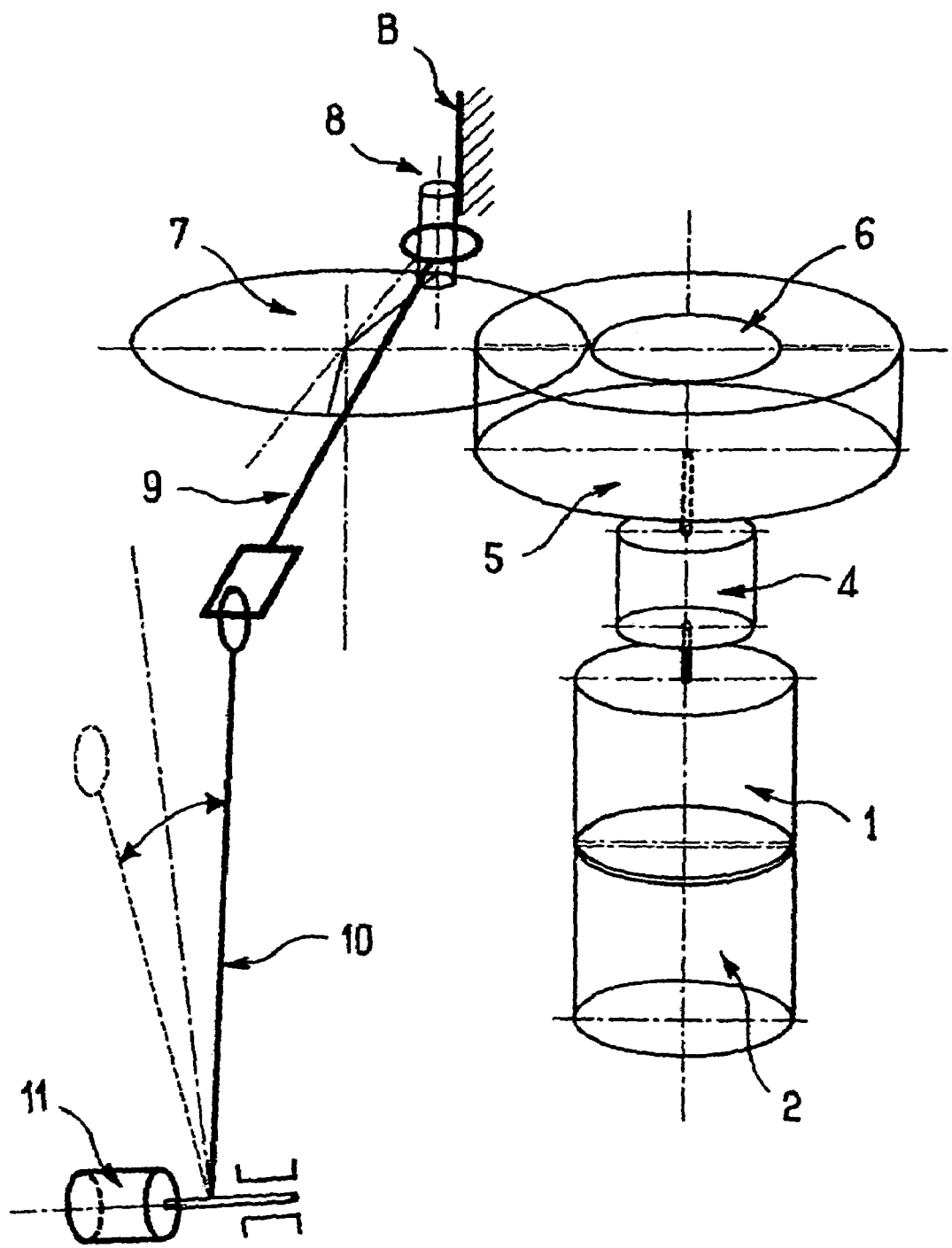

Two embodiments are described hereinbelow.

In both of these embodiments, notice is taken of the absence of a differential and wheel/tangent screw. These choices enable:

Reliability (by the reduction in the number of parts and the design),

Consumption (by a high motor/output efficiency),

Vibrating environment.

The actuator in accordance with the first embodiment has a particularly simple design and a reduced number of parts.

It includes:

A three-phase asynchronous motor consisting of a squirrel-cage rotor, an insulated double-winding stator, and stalling protection. This motor is derived from "space" applications. The moving parts are of normalized mass in order to tolerate vibration and shocks.

A synchronous permanent magnet coupler making it possible to disengage the motor when the actuator reaches the stop.

A high-efficiency reversible gear reducer.

An irreversible lever device, making it possible to ensure irreversibility at the end-of-travel position. This device eliminates the use of tangent screws detrimental to efficiency and therefore the use of an "oversized" motor, and ensures a positive irreversibility independent of the vibrations.

As for itself, the actuator in accordance with the second embodiment includes the following elements:

Two conventional three-phase asynchronous motors.

Two couplers each consisting of a centrifugal coupler and a synchronous coupler. These couplers make it possible to disengage the motors when the actuator reaches the stop, and to ensure operation in the event that the motor stalls. The use of such devices makes it possible to provide:

A gear reducer and a lever device.

First Embodiment

The solution adopted makes it possible to use the same actuator for the various applications of uplock boxes known as "UPLOCKS".

Of course, variants may be redesigned in relation to displacement travel.

The diagram of the kinematic chain is shown in FIG. 1.

The three-phase asynchronous technology motor 1, powered with a 115-Volt alternating current having a variable frequency of between 360 and 800 Hz, has a double stator winding and a single rotor. Each winding is separate and electrically insulated.

This solution has the advantage of being much more reliable than another motor technology. In actuality, the number of parts and components is reduced in the assembly of the motor, in its control, and in its EMC/EMI filtering. Moreover, the number of moving parts is limited to that which is absolutely necessary, which is preferable to two motors coupled to a differential gear train.

This device operates without any electronic circuit, which, in particular, eliminates the disadvantages associated with the reliability and obsolescence of the active and passive components.

The single output shaft 3 is coupled directly to a torque limiter rep 4 designed to absorb the shock of the abrupt stop of the kinematic chain elements when the output of the gear reducer or output shaft strikes against the mechanical stops in the end-of-travel position. This limiter also enables the motor to continue to run when the gear reducer is idle, which safeguards the service life of the windings.

This magnetic technology torque limiter rep 4 has the advantage of transmitting a weak torque and therefore that of having small dimensions.

Furthermore, this technique has the advantage of considerably reducing the dissipation of energy supplied by the motor when the output shaft has reached the stop position because the loss of synchronism brings about the magnetic breakdown and therefore the drop in transmission torque. The motor then runs almost in neutral.

The output of the torque limiter is equipped with a pinion rep 5 which meshes directly with the first stage of a straight-toothed gear reducer rep 6. In order to obtain a good level of efficiency for this gear reducer, the first stages are equipped with preloaded ball bearings. The output stages have plain ring gauges.

The output pinion of the gear reducer meshes directly with a crank plate 7 equipped with a toothed wheel and a crank pin 8. Said plate is driven in a rotating movement the angular amplitude of which is limited to approximately 200° by 2 stops integral with the body of the actuator. These mechanical stops enable a small connecting rod 9 of the plate 7 to be locked in its end-of-travel position.

The head of this short small connecting rod 9 is articulated to the crank pin of the crank plate 7. It imparts a rotating movement to the end of the long connecting rod 10 running between 2 guides. The other end of this connecting rod is integral with the output shaft of the actuator in order to transmit a limited rotating movement (e.g., limited to 12° to 13°).

This mechanical system forms a kinematic chain which is locked at the ends of the angular travel.

In its counterclockwise rotation CCW, point B, symbolizing the crank pin of the plate, comes into contact with the mechanical stop CCW (this stop maybe external to the actuator), after having bypassed point E (see the illustration in FIG. 2). Said point E is fixed in relation to the actuator housing and is the limit of travel physically representing the possible non-return of the movement of the plate as a result of the action of the small connecting rod, without encountering the stop CCW.

This system consisting of connecting rod+small connecting rod+plate+stop is thereby locked in the counterclockwise direction CCW by any movement coming from the connecting rod, hence from the output shaft of the actuator, symbolized by point D (see the position in FIG. 2).

Only by reversing the direction of rotation of the plate 7, which is capable of rotating clockwise, are the small connecting rod 9 and the connecting rod 10 able to travel, and thereby unlock the kinematic chain.

Thus, said connecting rod travels first towards the stop external to the actuator by applying stress to the sub-assembly consisting of the small connecting rod+connecting rod; at that moment, the output shaft (point D) is not rotating. This stress is absorbed by an elastic deformation of one of the (appropriately shaped) parts making up the kinematic chain. Said deformation reaches its maximum when point B (crank pin) encounters point E, and decreases there beyond until it frees the output shaft to rotate.

Thus, after having passed by point E (fixed in relation to the housing), the crank pin meets up again with the other stop CW by rotating clockwise CW.

In its clockwise rotation CW, point B, symbolizing the crank pin of the plate, this time comes into contact with the mechanical stop CW (this stop may be external to the actuator) after having bypassed point F (see illustration in FIG. 3). Said point F is fixed in relation to the actuator housing and is the limit of travel physically representing the possible non-return of the movement of the plate, as a result of the action of the small connecting rod, without encountering the stop CW.

The system consisting of connecting rod+small connecting rod+plate+stop is thereby locked in its clockwise rotation CW by any movement coming from the connecting rod, hence from the output shaft of the actuator, symbolized by point D (see the position in FIG. 3).

Only by reversing the direction of rotation of the plate 7, which is capable of rotating counterclockwise, are the small connecting rod 9 and the connecting rod 10 able to travel, and thereby unlock the kinematic chain.

Thus, said connecting rod travels first towards the stop external to the actuator by applying stress to the sub-assembly consisting of the small connecting rod+connecting rod; at that moment, the output shaft (point D) is not rotating. This stress is absorbed by an elastic deformation of one of the (appropriately shaped) parts making up the kinematic chain. Said deformation reaches its maximum when point B (crank pin) encounters point F, and decreases there beyond until it frees the output shaft to rotate.

Thus, after having passed by point F (fixed in relation to the housing), the crank pin once again meets up with the other stop CCW by rotating clockwise CCW.

Second Embodiment

As in the case of option 1, the principle adopted likewise consists in using the same actuator for the 7 different applications of uplock boxes known as "UPLOCKS". If necessary, a variant may be redesigned to distinguish travel with an angular displacement of 13° in relation to those of 14°.

The solutions implemented to ensure the actuator functions are presented in the design described herein below:

The diagram of the kinematic chain is shown in FIG. 4 on the following page.

Two three-phased asynchronous technology motors rep 1 and 2, powered with a 115-Volt alternating current having a variable frequency of between 360 and 800 Hz, has a single stator winding.

This solution has the advantage of being much more reliable than another motor technology. In actuality, the number of parts and components is reduced in the assembly of the motor, in its control and in its EMC/EMI filtering. Moreover, the number of moving parts is limited to that which is absolutely necessary, which is preferable to two motors coupled to a differential gear train.

This device operates without any electronic circuit, which, in particular, eliminates the disadvantages associated with the reliability and obsolescence of the active and passive components.

The output shaft of each of the motors is coupled directly to a centrifugal clutch 3, which makes it possible to disconnect the rotor of a broken-down motor from the kinematic chain of the actuator. Thus, the working motor is able to start without taking on the additional load of the defective motor.

The output of the centrifugal clutch is connected to a torque limiter 4 designed to absorb the shock of the abrupt stop of the kinematic chain elements when the output of the gear reducer or output shaft strikes against the mechanical stops in the end-of-travel position. This limiter also enables the motor to continue to run when the gear reducer is idle, which safeguards the service life of the windings.

This magnetic technology torque limiter rep 4 has the advantage of transmitting a weak torque and therefore that of having small dimensions.

Furthermore, this technique has the advantage of considerably reducing the dissipation of energy supplied by the motor when the output shaft has reached the stop position because the loss of synchronism brings about the magnetic breakdown and therefore the drop in transmission torque. The motor then runs almost in neutral.

The output of each of the two torque limiters 4 is equipped with a pinion rep 5 which meshes directly with the first stage of a straight-toothed gear reducer 6. In order to obtain a good level of efficiency for this gear reducer, the first stages are equipped with preloaded ball bearings 13.

The output stages have plain ring gauges 15.

The output pinion of the gear reducer meshes directly with a crank plate 7 equipped with a toothed wheel and a crank pin 8. Said plate is connected to the clutch assembly enabling the irreversible locking of the output shaft rep 11 at the ends of its travel; this arrangement is identical to that of the first embodiment.

The operation of the system of irreversibility is described above with respect to the solution of the first embodiment.

Sample Dimensions

The speed reducing ratio is high and is calculated on the basis of motors having two pairs of poles:

N motor=10,500 rps for a slight slippage, i.e., 175 rps when the frequency is at 360 Hz.

The output crank pin (rep 8 in FIG. 1) of the gear reducer must rotate at 0.24 rps.

Thus, the ratio is 175/0.24=729 for the gear reducer.

The gear reducer rep 6 consists of 4 stages:

R1 on the crank plate=5.8 (0.75-mm module);

R2=R3=R4=R5 (0.5-mm module) with identical staged wheels.

Thus, the speed reducing ratio is: 5.8×125=725.

The drive pinion (motor output) has 15 teeth.

The gear reducer efficiency is: 0.92×0.97×0.97×0.97=0.84

0.92 for R1

0.97 for R2, R3 and R4.

The efficiency of the connecting rod-crank system is: 0.98× 0.92×0.95=0.85

0.98 for the output shaft 0.92 for the connecting rod coupling (slider included)

0.95 for the crank

Hence, an overall mechanical efficiency of 0.89×0.88=0.71.

The input torque to be overcome is 60 NM (AT) in 2.5 seconds or else 120 NM (2 AT) in much longer period of time.

The reduction of the connecting rod system is approximately 10.

In order to prevent the effects of unfeathering in the presence of the mechanical environment (vibrations, shocks, jolts . . . ), a frictional torque for holding the crank in the stop position is provided on the first stage of the gear reducer, i.e., of approximately 0.001 NM. This friction is produced by a magnetic device having permanent magnets.

The design basis of the motor for a single winding is as follows:

Torque to be produced under the worst conditions:

$$(60/10/725/0.71)+0.001=0.013 NM.$$

The invention claimed is:

1. Electromechanical actuator comprising at least one electric motor, as well as coupling and gear reduction means, which drive an output shaft, characterized in that said coupling and gear reduction means mesh with a crank plate designed to be driven in rotation with an angular travel limited by two stops, a small connecting rod being articulated at one end to a crank pin of said crank plate and being articulated at its other end to a long connecting rod which is itself integral with the output shaft, the two ends of said long connecting rod each being guided respectively in their travel along a guide, and in that the displacement angle between said two stops is greater than 180°, the movements of the connecting rod being structurally locked when, following an override, the crank plate is situated directly adjacent to one of its travel limit stops.

2. Actuator as claimed in claim 1, characterized in that it includes a double-stator asynchronous motor.

3. Actuator as claimed in claim 1, characterized in that it includes two asynchronous motors.

4. Actuator as claimed claim 1, claim 2 or claim 3, characterized in that the coupling means include a torque limiter.

5. Actuator as claimed in claim 4, characterized in that said torque limiter is of the magnetic type.

6. Actuator as claimed claim 1, characterized in that the displacement angle of the crank plate between the two stops is of the order of 200°.

7. Actuator as claimed claim 1, characterized in that the angular displacement possible for the connecting rod is of the order of 12-13°.

8. Actuator as claimed claim 1, characterized in that the gear reduction means include first stages equipped with preloaded ball bearings.

9. Actuator as claimed in claim 1, characterized in that the gear reduction means include output stages with plain ring gauges.

10. Actuator for a landing gear uplock box and/or for the doors of such boxes, characterized in that it consists of an actuator as claimed claim 1.

* * * * *